(12) United States Patent
Bennion et al.

(10) Patent No.: US 8,806,882 B2
(45) Date of Patent: Aug. 19, 2014

(54) PARALLEL INTEGRATED THERMAL MANAGEMENT

(75) Inventors: Kevin Bennion, Littleton, CO (US); Matthew Thornton, Golden, CO (US)

(73) Assignee: Alliance for Substainable Energy, LLC, Golden, CO (US)

( * ) Notice: Subject to any disclaimer, the term of this patent is extended or adjusted under 35 U.S.C. 154(b) by 785 days.

(21) Appl. No.: 13/035,082

(22) Filed: Feb. 25, 2011

(65) Prior Publication Data

US 2012/0216983 A1 Aug. 30, 2012

(51) Int. Cl.
| | |
|---|---|
| *F25B 27/00* | (2006.01) |
| *B60H 1/32* | (2006.01) |
| *F25B 13/00* | (2006.01) |
| *F25D 17/00* | (2006.01) |
| *F01P 7/16* | (2006.01) |
| *B60L 1/02* | (2006.01) |
| *B60H 1/00* | (2006.01) |
| *B60W 30/194* | (2012.01) |

(52) U.S. Cl.
CPC ......... *B60H 1/00907* (2013.01); *B60L 2260/56* (2013.01); *F01P 7/165* (2013.01); *B60L 1/02* (2013.01); *B60W 30/194* (2013.01); *B60H 2001/00949* (2013.01); *F01P 2050/24* (2013.01)
USPC .......... 62/323.1; 62/238.7; 62/244; 62/324.6; 62/324.1; 62/239; 62/333; 62/323.2; 165/97; 123/41.31; 123/41.29; 180/65.275; 180/65.21

(58) Field of Classification Search
CPC ............ F25B 7/00; F25B 41/00; F25B 13/00; B60H 3/00; B60H 1/00
USPC .......... 62/238.7, 244, 324.6, 324.1, 239, 333, 62/323.2; 165/97; 123/41.31, 41.29; 180/65.275, 65.21
See application file for complete search history.

(56) References Cited

U.S. PATENT DOCUMENTS

| | | | |
|---|---|---|---|
| 6,112,543 A * | 9/2000 | Feuerecker et al. ............. | 62/430 |
| 6,607,142 B1 | 8/2003 | Boggs et al. | |
| 7,191,858 B2 | 3/2007 | Vanderwees et al. | |
| 7,261,068 B1 * | 8/2007 | Wantschik ................. | 123/41.29 |
| 7,270,090 B2 | 9/2007 | Surnilla | |
| 7,789,176 B2 | 9/2010 | Zhou | |
| 2003/0182955 A1 * | 10/2003 | Hirao et al. ..................... | 62/202 |
| 2007/0267169 A1 * | 11/2007 | Acre .............................. | 165/42 |
| 2008/0251303 A1 * | 10/2008 | Rouaud et al. .............. | 180/65.2 |
| 2009/0145375 A1 * | 6/2009 | Kaita et al. ................ | 123/41.02 |
| 2010/0295391 A1 | 11/2010 | Perkins et al. | |
| 2011/0132017 A1 * | 6/2011 | Kim et al. .................... | 62/259.2 |
| 2011/0296855 A1 * | 12/2011 | Johnston et al. ................. | 62/79 |

OTHER PUBLICATIONS

"FreedomCAR & Fuel Partnership, Electrical and Electronics Technical Team Roadmap", Nov. 2006, pp. 1-19.
"FreedomCAR & Fuel Partnership, Electrical and Electronics Technical Team Roadmap", Dec. 7, 2010, accessed at http://www1.eere.energy.gov/vehiclesandfuels/pdfs/program/eett_roadmap_12-7-10.pdf, pp. 1-73.

(Continued)

*Primary Examiner* — Mohammad M Ali
*Assistant Examiner* — Erik Mendoza-Wilkenfe
(74) *Attorney, Agent, or Firm* — John C. Stolpa

(57) ABSTRACT

Embodiments discussed herein are directed to managing the heat content of two vehicle subsystems through a single coolant loop having parallel branches for each subsystem.

10 Claims, 10 Drawing Sheets

(56) References Cited

OTHER PUBLICATIONS

"Partnership Plan: FreedomCAR & Fuel Partnership", Mar. 2006, accessed at http://www1.eere.energy.gov/vehiclesandfuels/program/fc_fuel_partnership_plan.pdf.

Ap, et al., "UltimateCooling™ new cooling system concept using the same coolant to cool all vehicle fluids", IMechEC599/010/2003, Vehicle Thermal Management: Heat Exchangers and Climate Control, SAE, Apr. 2004, pp. 125-138.

Bennion, et al., "Integrated Vehicle Thermal Management for Advanced Vehicle Propulsion Technologies", NREL/CP-540-47416 Conference Paper, presented at SAE 2010 World Congress, Apr. 13-15, 2010, pp. 1-15.

Hsu, et al., "Barriers to the Application of High-Temperature Coolants in Hybrid Electric Vehicles", Sep. 2006, Prepared by the Oak Ridge National Laboratory, Engineering Science and Technology Division, ORNL/TM-2006-514, pp. 1-42.

Hughes, et al., "Feasibility of Intelligent Control Strategies to Reduce Cooling System Size", SAE Technical Paper Series (2001-01-1759), reprinted from The Proceedings of the 2001 Vehicle Thermal Management Systems Conference, 2001, pp. 1-6.

Kargilis, Design and Development of Automotive Engine Cooling Systems, Apr. 2008, p. 8.2 and p. 12, ALKAR Engineering Company.

Kargilis, Design and Development of Automotive HVAC systems, Apr. 2008, p. 76.1, ALKAR Engineering Company.

Kelly, "Overview of APEEM Thermal Control Research Projects, NREL/PR-540-42357, DOE FreedomCAR and Vehicle Technologies Program Advanced Power Electronics and Electric Machines Projects FY '08 Kickoff Meeting", Nov. 6, 2007, pp. 1-7.

Vetter, et al., "Automotive AC/HP Systems Using R744 (CO2)", IMechE C599/098/2003, 2003, pp. 1-14.

* cited by examiner

PARALLEL INTEGRATED THERMAL MANAGEMENT

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Many current cooling systems for hybrid electric vehicles (HEVs) having a high power electric drive system utilize a low temperature liquid cooling loop for cooling power electronics and electric machines associated with the electric drive system. These vehicles may utilize a separate cooling loop for other vehicle components, such as an internal combustion engine. The cost of the separate low temperature coolant utilized only for cooling of the electric drive system often adds substantial cost to the overall cost of the electric drive system. Thus, it may be desirable to remove the dedicated cooling loop for the power electronics and electric machines to reduce cost and potentially increase cooling system efficiency.

The foregoing examples of the related art and limitations related therewith are intended to be illustrative and not exclusive. Other limitations of the related art will become apparent to those of skill in the art upon a reading of the specification and a study of the drawings.

SUMMARY

Embodiments discussed herein are directed to managing the heat content of two or more vehicle subsystems through a single coolant loop having parallel branches for each subsystem. The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

In various aspects, the present disclosure relates to a thermal management system for an automobile, comprising: a coolant loop having a coolant loop junction, the coolant loop junction configured to receive coolant from a radiator output and to distribute the coolant between a first coolant loop branch and a second coolant loop branch; a first heat exchanger connected to the coolant loop junction by the first coolant loop branch and configured to use coolant received from the coolant loop junction to exchange heat with a first vehicle component; a second heat exchanger connected to the coolant loop junction by the second coolant loop branch and configured to use coolant received from the coolant loop junction to exchange heat with a second vehicle component; and a control element configured to control flow of coolant in at least one of the first and second coolant loop branches in response to a condition detected in at least one of the first and second vehicle components.

In some embodiments, the thermal management system further comprises: a first pump disposed between the radiator and the coolant loop junction, the first pump configured to provide coolant to the first coolant loop junction.

In some embodiments, the control element is configured to maintain a target rate of heat exchange in at least the second heat exchanger by varying a rate at which coolant is pumped through the first pump in response to the condition detected in the at least one of the first and second vehicle components.

In some embodiments, the first pump is additionally connected to a radiator bypass path; in a first mode, heated coolant from at least a second heat exchanger output is provided directly to the first pump through the radiator bypass path; and in a second mode, heated coolant from at least the second heat exchanger output is cooled by the radiator and then provided to the first pump.

In some embodiments, the thermal management system further comprises a second coolant loop junction configured to receive heated coolant from both the first and second coolant loop branches and to output the received coolant in a single output flow to either the radiator or to the radiator bypass path.

In some embodiments, the thermal management system further comprises: a second pump disposed between the first heat exchanger and the second heat exchanger, the second pump configured to provide heated coolant from the second heat exchanger output to the first heat exchanger in a reverse flow through the first heat exchanger.

In some embodiments, the first vehicle component is an internal combustion engine and the second vehicle component is an electric system.

In some embodiments, the first vehicle component is an air conditioning system and the second vehicle component is an electric system.

In some embodiments, the first vehicle component is a transmission fluid system and the second vehicle component is an electric system.

In various aspects, the present disclosure relates to a thermal management system for an automobile, comprising: means for distributing coolant output from a radiator between a first coolant loop branch and a second coolant loop branch; first means for exchanging heat between the first coolant branch and a first vehicle component, the first means for exchanging heat connected to the means for distributing; second means for exchanging heat between the second coolant branch and a second vehicle component, the second means for exchanging heat connected to the means for distributing; and means for regulating temperature connected to at least one of the first and second vehicle components, the means for regulating temperature configured establish a pattern of coolant flow in the first and second coolant loop branches in response to a condition detected in at least one of the first and second vehicle components.

In some embodiments, wherein the means for regulating temperature cools both the first and second vehicle components by dividing the coolant output from the means for distributing coolant between the first and second coolant loop branches.

In some embodiments, the means for regulating temperature cools the second vehicle component and not the first vehicle component by routing all of the coolant output from the means for distributing coolant to the second coolant loop branch.

In some embodiments, the means for regulating temperature cools the first vehicle component and not the second vehicle component by routing all of the coolant output from the means for distributing coolant to the first coolant loop branch.

In some embodiments, the means for regulating temperature cools the second vehicle component and heats the first vehicle component by routing all of the coolant output from the means for distributing coolant to the second coolant loop branch and routing a portion of coolant output from the second heat exchanger to the first heat exchanger in a reverse flow through the first heat exchanger.

In some embodiments, the means for regulating temperature cools the second vehicle component and heats the first vehicle component by dividing the coolant output from the means for distributing coolant between the first and second coolant loop branches and routing coolant output from the first and second heat exchangers to the means for distributing coolant through a bypass path around the radiator.

In various aspects, the present disclosure relates to a thermal management method for an automobile, comprising: engaging an electric system of a hybrid electric vehicle while an internal combustion engine of the hybrid electric vehicle is inactive; receiving coolant from a radiator at a coolant loop junction, the coolant loop junction distributing the coolant between a first coolant loop branch and a second coolant loop branch; determining if a temperature of the internal combustion engine of the hybrid electric vehicle is below a predetermined threshold temperature; and while the temperature of the internal combustion engine is below the threshold temperature, transferring heat from the second coolant loop branch that is rejected by the electric system to the internal combustion engine through the first coolant loop branch.

In some embodiments, wherein the operation of transferring heat comprises: routing all of the coolant output from the coolant loop junction though the second coolant loop branch to the electric system; and routing a portion of coolant output from the electric system to the internal combustion engine in a reverse flow through the first coolant loop branch.

In some embodiments, the operation of transferring heat comprises: routing a portion of the coolant output from the coolant loop junction though the first coolant loop branch to the internal combustion engine; routing a portion of the coolant output from the coolant loop junction though the second coolant loop branch to the electric system; and routing coolant output from the internal combustion engine and the electric system to the coolant loop junction through a bypass path around the radiator.

In some embodiments, the thermal management method further comprises: engaging the internal combustion engine of the hybrid electric vehicle; routing a portion of the coolant output from the coolant loop junction though the first coolant loop branch to cool the internal combustion engine; routing a portion of the coolant output from the coolant loop junction though the second coolant loop branch to cool the electric system; and routing coolant output from the internal combustion engine and the electric system to the radiator and to the coolant loop junction.

In some embodiments, the thermal management method further comprises: disengaging the internal combustion engine of the hybrid electric vehicle; preventing coolant from flowing from the coolant loop junction to the first coolant loop branch in order to maintain heat in the internal combustion engine; and routing all of the coolant output from the coolant loop junction though the second coolant loop branch to the electric system.

In various aspects, the present disclosure relates to a thermal management method for an automobile, comprising: receiving coolant from a radiator at a coolant loop junction component the coolant loop junction configured to distribute the coolant between a first coolant loop branch and a second coolant loop branch; determining if an air conditioning system of the automobile is set to a cooling mode wherein the air conditioning system provides cool air to an automobile cabin; and in the event that the air conditioning system is set to the cooling mode, routing a portion of the coolant output from the coolant loop junction though the first coolant loop branch to remove heat from the air conditioning system and routing a portion of the coolant output from the coolant loop junction though the second coolant loop branch to remove heat from an electric system.

In some embodiments, the thermal management method further comprises: determining if the air conditioning system of the vehicle is set to function as a heat pump wherein the air conditioning system provides heated air to the vehicle cabin; and while the air conditioning system is set to the heating mode, transferring heat from the second coolant loop branch that is rejected by the electric system to the air conditioning system through the first coolant loop branch.

In some embodiments, the operation of transferring heat comprises: routing all of the coolant output from the coolant loop junction though the second coolant loop branch to the electric system; and routing a portion of coolant output from the electric system to the air conditioning system in a reverse flow through the first coolant loop branch.

In some embodiments, when the air conditioning system is set to the heating mode, refrigerant flows in a reverse direction through the air conditioning system.

In some embodiments, the thermal management method further comprises: if the air conditioning system of the vehicle is off; and while the air conditioning system is off, preventing coolant from flowing from the coolant loop junction to the first coolant loop branch, and routing all of the coolant output from the coolant loop junction though the second coolant loop branch to cool the electric system.

In some embodiments, the thermal management method further comprises: while the air conditioning system is set to the cooling mode, determining that the electric system is overheated; and in response to determining that the electric system is overheated, preventing coolant from flowing from the coolant loop junction to the first coolant loop branch, and routing all of the coolant output from the coolant loop junction though the second coolant loop branch to cool the electric system.

In addition to the exemplary aspects and embodiments described above, further aspects and embodiments will become apparent by reference to the drawings and by study of the following descriptions.

BRIEF DESCRIPTION OF THE DRAWINGS

Those skilled in the art will understand that the drawings, described herein, are for illustration purposes only. The drawings are not intended to limit the scope of the present disclosure.

DETAILED DESCRIPTION

Reference is now made in detail to certain embodiments directed to managing the heat content of two or more vehicle subsystems through a single coolant loop having parallel branches for each subsystem. The disclosed embodiments are not intended to be limiting of the claims. To the contrary, the claims are intended to cover all alternatives, modifications, and equivalents.

Embodiments discussed herein are directed to managing the heat content of two or more vehicle subsystems through a single coolant loop having parallel branches for each subsystem. The subsystems for which heat content is managed may be components of a vehicle, such as a hybrid electric vehicle (HEV), a plug-in hybrid electric vehicle (PHEV), an electric vehicle (EV), and a fuel cell vehicle (FCV). Embodiments discussed herein may also be used in connection with light-duty, medium-duty, or heavy-duty vehicle applications.

System Overview

Figure 1:
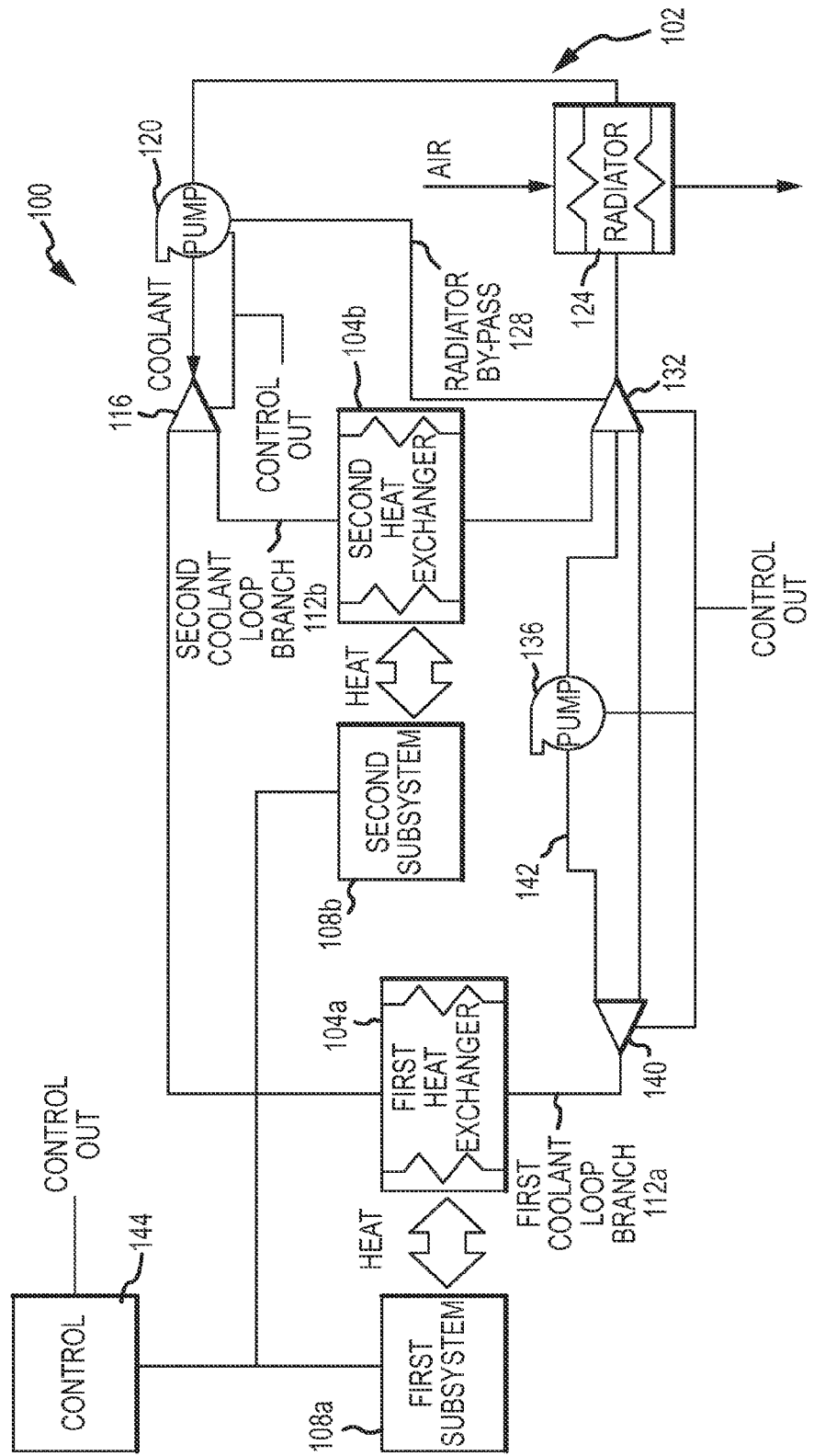
FIG. 1 is a schematic illustration of an embodiment of a parallel integrated thermal management system.

FIG. 1 is a schematic illustration of a parallel integrated thermal management system according to certain embodiments of the present disclosure, generally identified by reference numeral 100. The parallel integrated thermal management system 100 includes a first heat exchanger 104a thermally coupled to a first vehicle subsystem 108a, and a second heat exchanger 104b thermally coupled to a second vehicle subsystem 108b. The first and second subsystem 104a-b may be for example, an electric subsystem, a power electronics subsystem, an internal combustion engine, an air conditioning subsystem, a brake fluid subsystem, a heat pump, a transmission fluid system, or other suitable automotive subsystem. Generally, the first and second subsystems 104a-b may be any vehicle component that may be cooled through the operation of a heat exchanger.

The heat exchangers 104a-b are configured to remove heat from and/or add heat to the first and second subsystems 108a-b. Generally, the heat exchangers 104a-b may operate by, passing a fluid of lower temperature across a surface of a tube or other structure that carries a fluid of a high temperature. A temperature change occurs in the fluids as heat is passed between the fluids through the tube or other structure.

The system 100 may include a coolant loop 102 having a coolant loop junction 116 providing fluid to a first coolant loop branch 112a and a second coolant loop branch 112b. The coolant can be any heat transfer fluid suitable for use in a vehicle such as, for example, water, deionized water, ethylene glycol, poly(ethylene glycol), diethylene glycol, propylene glycol, betaine, polyalkylene glycols, copper oxide nanofluids, alumina nanofluids, titanium dioxide nanofluids, silica nanofluids, carbon nanofluids, and combinations thereof. In certain embodiments, a mixture of water and ethylene glycol and/or poly(ethylene glycol) may circulate in the coolant loop 102 to be cooled by a radiator 124 and to exchange heat through the operation of heat exchangers 104a-b. The first heat exchanger 104a is provided with coolant through a first coolant loop branch 112a. Similarly, the second heat exchanger 104b is provided with coolant through a second coolant loop branch 112b. In the depicted embodiment (FIG. 1), the first and second coolant loop branches 112a-b are arranged in a parallel configuration. In this configuration, the first and second coolant loop branches 112a-b both originate from a first coolant loop junction 116. The coolant loop junction 116 is provided with a single stream of incoming coolant. The coolant loop junction 116 may include one or more valves that are electrically actuated to control coolant flow from the coolant loop junction 116.

The first coolant loop junction 116 generally receives a supply of coolant from a pump 120 and distributes the coolant between the first and second coolant loop branches 112a-b. The pump 120 may receive coolant from the radiator 124. The radiator 124 is configured to receive heated coolant output from either or both of the first and second heat exchangers 104a-b and to remove heat from the heated coolant. The radiator 124 may include a fan that passes air across cooling elements through which the heated coolant travels. The radiator 124 may be at the front of a vehicle such that, when the vehicle moves, air from outside the vehicle passes across the cooling elements of the radiator 124. Once the coolant is cooled by the radiator 124, the coolant exits the radiator 124 and is passed to the pump 120.

The system 100 may additionally include a radiator bypass path 128. The radiator bypass path 128 may receive heated coolant from either or both of the first and second heat exchangers 104a-b and divert the heated coolant directly to the pump 120, thereby bypassing the radiator 124. The radiator bypass path 128 may be used in modes of operation that seek to retain heat in the system 100 or to pass heat between the first and second subsystems 104a-b.

In addition to the first coolant loop junction 116, the system 100 may include a second coolant loop junction 132. The second coolant loop junction 132 is positioned downstream from the first and second heat exchangers 104a-b. The second coolant loop junction 132 receives heated coolant from the first and second coolant loop branches 112a-b and outputs coolant in a single output stream. The single stream of coolant output from the second coolant loop junction 132 may be provided either to the radiator 124 or to the radiator bypass path 128. The second coolant loop junction 132 may include one or more valves that are electrically able to control coolant flow from the second coolant loop junction 132.

The system 100 also may include a second pump 136 associated with a portion of the first coolant loop branch 112a downstream from the first heat exchanger 104a. The second pump 136 may be connected between the second coolant loop junction 132 and a third coolant loop junction 140. The third coolant loop junction 140 may include one or more valves that are electrically able to control coolant flow from the third coolant loop junction 140. The third coolant loop junction 140 may be configured to receive coolant output from the first heat exchanger 104a and to convey coolant to the second coolant loop junction 132. The second pump 136 may operate to reverse the direction of coolant flow in the first heat exchanger 104a. When engaged, the pump 136 moves coolant from the second coolant loop junction 132 through a pump branch 142 to the third coolant loop junction 140 where the coolant then moves through the heat exchanger 104a in the direction of the first coolant loop junction 116. By reversing the coolant flow in the first heat exchanger 104a, the second pump 136 operates to add heat to the first subsystem 108a.

Specifically, the coolant received as input to the second pump 136 is output from the heat exchanger 104a and is thereby heated. Accordingly, the second pump 136 may operate to transfer heat from the second subsystem 108a to the first subsystem 108a.

The system 100 is generally configured to control the rate at which coolant flows through the first and second coolant loop branches 112a-b. In certain embodiments, the system is configured to operate in any one of three coolant output configurations, namely a combined cooling mode, a subsystem off mode, or a waste heat utilization mode. The system 100 is configured such that it can readily switch from one coolant output configuration to another. In certain embodiments, the system 100 operates in a "combined cooling mode." In the "combined cooling mode," the system 100 allows coolant to flow in both the first and second coolant loop branches 112a-b. In certain embodiments, the system 100 operates in a "subsystem off mode." In the "subsystem off mode," the system 100 allows coolant to flow in the first coolant loop branch 112a, but prevents coolant from moving in the second coolant loop branch 112b. Also in the subsystem off mode, the system 100 is configured to allow coolant to flow in the second coolant loop branch 112a and not in the first coolant loop branch 112a. In certain embodiments, the system 100 operates in a "waste heat utilization mode." In the "waste heat utilization mode," the system 100 is configured to transfer heat from the second subsystem 108b to the first subsystem 108a by reversing coolant flow in the first coolant loop branch 112a or bypassing the radiator 124. In connection with these various modes of operation, the first coolant loop junction 112 is configured to distribute the coolant received from the pump 120 between either or both of the first and second coolant loop branches 112a-b.

A control element 144 may shift the coolant loop junction 116 between these three coolant output configurations. The control element 144 may be connected to either or both of the subsystems 108a-b and provide control output based on input received from the subsystems 108a-b. For example, the control element 144 may include one or more thermostats responsive to a temperature measured in either or both of the subsystems 108a-b. The control element 144 may additionally include other circuit elements that may be configured to provide control output such as relays, microprocessors, microcontrollers, application specific integrated circuits, gate arrays, and so on. A control element 112 thermostat may trigger at a threshold temperature at which the subsystem 108a-b demands coolant from the system 100. In response to such a thermostat signal, the control element 144 may signal the first coolant loop junction 116 to provide coolant to the appropriate heat exchanger 104a-b associated with the subsystem 108a-b demanding coolant. In some embodiments, system 100 may be manually shifted between modes of operation or the control element 144 may be responsive to settings that are adjusted by the operator of the vehicle. For example, in a system 100 that includes an air conditioning subsystem, a vehicle operator may set an air conditioning mode and the system 100 may then adjust coolant flow to meet the demands of the air conditioning mode.

The control element 144 may additionally provide control output to various other components within the system 100 such as, for example, the first pump 120, the second pump 136, the second coolant loop junction 132, and the third coolant loop junction 140. In embodiments that call for greater control of the various components of the system, the control element 144 may include microprocessor or microcontroller that execute a stored program to carry out various function discussed herein. The stored program may be stored a in tangible computer readable medium associated with microprocessor. In certain embodiments, control functions may be executed by an application specific integrated circuit (ASIC) that is specially designed to be incorporated into the system 100. Other custom or customizable circuits such as field programmable gate arrays (FPGAs) and the like may be used.

As indicated above, the system 100 is configured to operate in three coolant output configurations, a combined cooling mode, a subsystem off mode, and a waste heat utilization mode that serve to manage the heat content of the first and second subsystems. The various modes of operation are described in detail below.

Combined Cooling Mode

Figure 2:
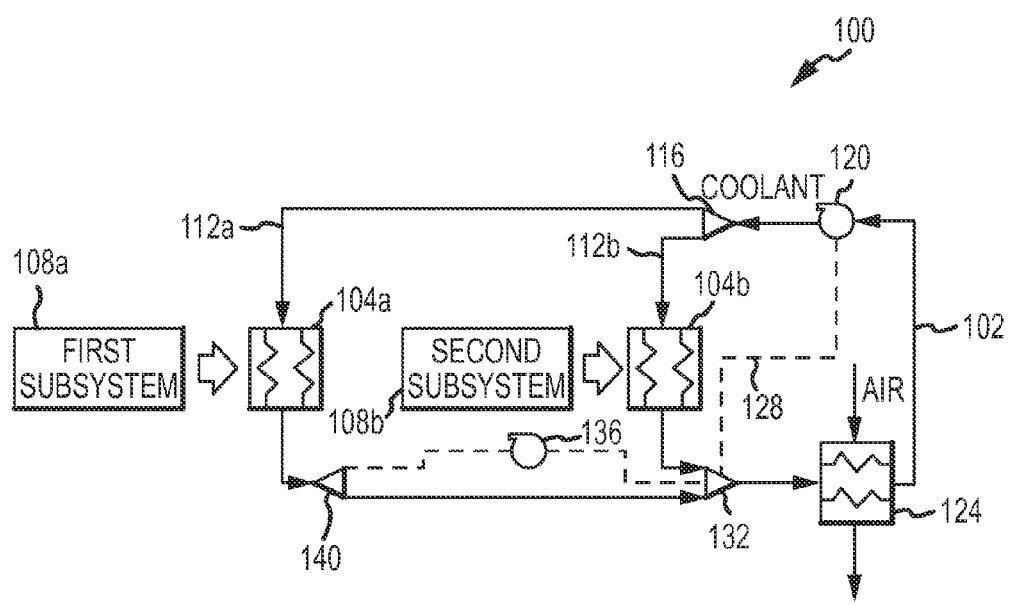
FIG. 2 is a schematic of a pattern of coolant flow that illustrates a combined cooling mode of the parallel integrated thermal management system of FIG. 1.

FIG. 2 is an illustration of a pattern of coolant flow that may be established in the system 100 in the combined cooling mode. For clarity, various system components, such as the control element 144, are omitted from FIG. 2 and other figures herein that illustrate coolant flow patterns. As shown in FIG. 2, the system 100 provides coolant to the first coolant loop branch 112a and the second coolant loop branch 112b to cool both the first and second subsystems 108a-b. As is indicated by the dashed lines, the radiator bypass 128 is disengaged such that heated coolant from the first and second heat exchangers 104a-b is provided to the radiator 124. Once cooled by the radiator 124, the pump 120 moves the coolant from the radiator 124 to the first coolant loop junction 116. From the first coolant loop junction 116, the coolant is provided to both the first and second coolant loop branches 112a-b and from there to both the first and second heat exchangers 104a-b. Passing through the first and second heat exchangers 104a-b, the coolant removes heat from the first and second subsystems 108a-b via heat exchange as described herein. Once output from the first and second heat exchangers 108a-b, the two branches of the coolant loop join together again at the second coolant loop junction 132 and are provided from there to the radiator 124. In the embodiment shown in FIG. 2, the second pump 136 is disengaged such that the flow of coolant through the first heat exchanger 104a is not reversed.

The pattern of coolant flow depicted in FIG. 2 may be established by the control element 144. In one embodiment, the control element 144 may electrically actuate a control valve in the first coolant loop junction 116 in response to a thermostat measurement or other temperature reading in one or both of the first and second subsystems 108a-b. For example, a temperature in the first subsystem 108a that is above a predetermined level may trigger a thermostat action that opens a valve in the first coolant loop junction 116 so that coolant is provided to the first subsystem 108a. The second subsystem 108a may include a similar configuration that operates to open a valve in the first coolant loop junction 116 to provide coolant to the second subsystem 108b, when needed.

The rate and/or quantity of coolant provided to the first subsystem 108a may be independent of the rate and/or quantity of the coolant provided to the second subsystem 108b, and vice versa. Different subsystems may generate different quantities of waste heat. For example, the heat load of an internal combustion engine will likely be greater than the heat load of a power electronics subsystem. Accordingly, optimal or desired coolant flow requirements may differ from subsystem to subsystem. With this in mind, the control element 144 may provide coolant to each coolant loop branch 112a-b to meet the individual subsystem 108a-b cooling requirements. Independent control of the flow through coolant loop branch 112*a-b* may be implemented by the control element 144 exercising control over the electric pump 120, the first coolant loop junction 116, and/or other flow control valve(s) and pumps within the system 100.

The flow pattern illustrated in FIG. 2, which provides coolant to separate subsystems 108*a-b* through parallel coolant loop branches 112*a-b*, is able to adjust coolant flow to match specific subsystem heat loads in manner that may be advantageous when compared to configurations that provide coolant to separate subsystems through a single, in-line coolant flow path, e.g. in a serial configuration. This type of serial configuration may lead to coolant temperature variations and/or coolant demand mismatches. These types of variations and/or mismatches are often avoided by the combined cooling mode of the present disclosure. Additionally, the combined cooling mode of the present disclosure may reduce the high parasitic pumping power that may be needed to pump a high volume flow rate of coolant through heat exchangers arranged in a serial configuration.

Subsystem Off Mode

Figure 3A:
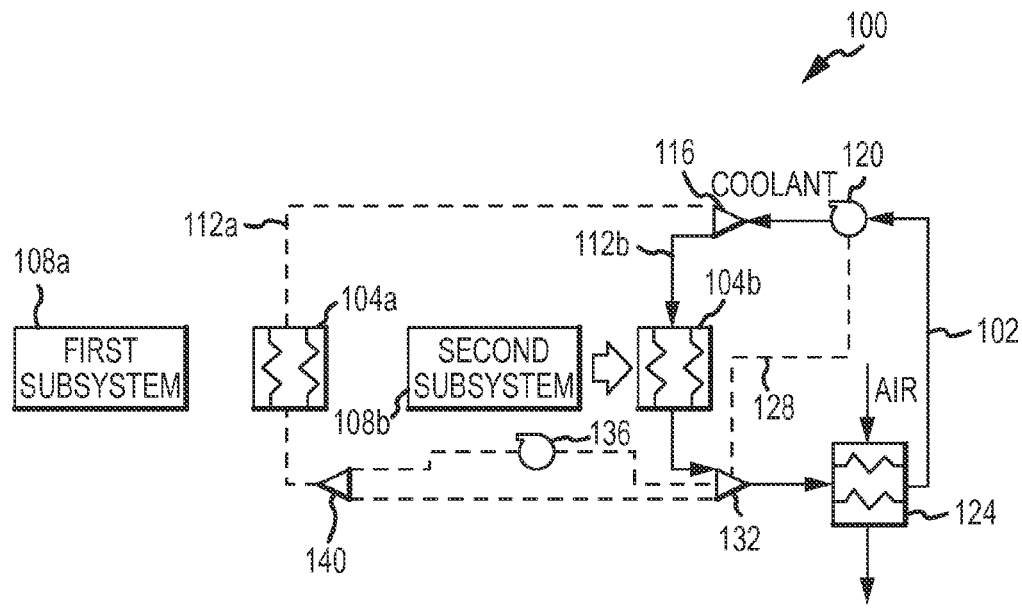
FIGS. 3A and 3B are schematics of patterns of coolant flow that illustrate a subsystem off mode of the parallel integrated thermal management system of FIG. 1.
Figure 3B:
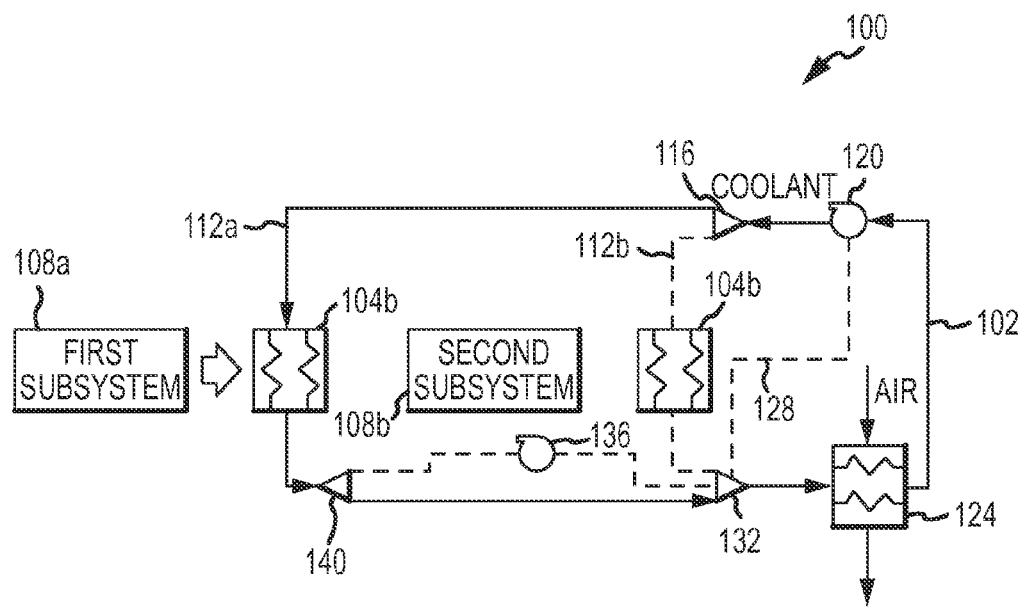

FIGS. 3A and 3B illustrate a pattern of coolant flow that may be established in the system 100 in the subsystem off mode. As shown in FIGS. 3A and 3B, the system 100 provides coolant to one subsystem, while flow to the other subsystem is disabled such that the other subsystem does not receive coolant. In FIG. 3A, the pump 120 receives coolant that has been cooled by the radiator 124 and provides the coolant to the first coolant loop junction 116. The coolant loop junction 116 routes the coolant from the pump 120 to the second heat exchanger 104*a* and not to the first heat exchanger 104*a*. Accordingly, as represented by the dashed lines in FIG. 3A, no coolant flows in the first coolant loop branch 112*a*. Once output from the second heat exchanger 104*b*, the coolant may pass through the second coolant loop junction 132 and from there to the radiator 124. In this configuration, the coolant passes through the second coolant loop junction 132 without joining with any downstream flow provided from the first heat exchanger 104*a*.

The first coolant loop junction 116 may route the coolant to the second heat exchanger 104*a* in response to control signals received from the control element 144. The system 110 may deprive the first heat exchanger 104*a* of coolant in order to avoid unwanted cooling of the first subsystem 108*a*. This may occur, for example, if the first subsystem 108*a* is an internal combustion engine that is warm from recent use, but temporarily inactive. Here, the internal combustion engine may operate more efficiently at a warmer temperature and thus it may be undesirable to cool the internal combustion engine.

FIG. 3B illustrates a pattern of coolant flow within the system 100 that supplies coolant to the first heat exchanger 104*a* and deprives the second heat exchanger 104*b* of coolant. Here, the pump 120 receives coolant that is cooled by the radiator 124 and provides the coolant to the first coolant junction 116. In turn, the first coolant loop junction 116 routes the coolant exclusively to the first coolant loop branch 112*a* and thereby to the first heat exchanger 104*a*. The coolant output from the heat exchanger 104*a* flows through the second coolant loop junction 132 without joining additional coolant from there to the radiator 124. As represented by the dashed lines in FIG. 3B, no coolant flows in the second coolant loop branch 112*a*. As is the case with the coolant loop flow pattern in FIG. 3*a*, the coolant loop flow pattern in FIG. 3*b* may operate to deprive the second heat exchanger 104*b* of coolant to thereby allow the heat content of the second subsystem 108B to rise.

In order to maintain constant flow rates within the system when one coolant branch is deprived of coolant, the control element 144 may provide a control output to the pump 120 to slow coolant flow. In the embodiment depicted in FIG. 3A, all of the system's coolant flows through the second heat exchanger 104*a*. In order to maintain a constant rate of heat exchange, the amount of coolant may be regulated by slowing the speed of the pump 120.

Waste Heat Utilization Mode

Figure 4:
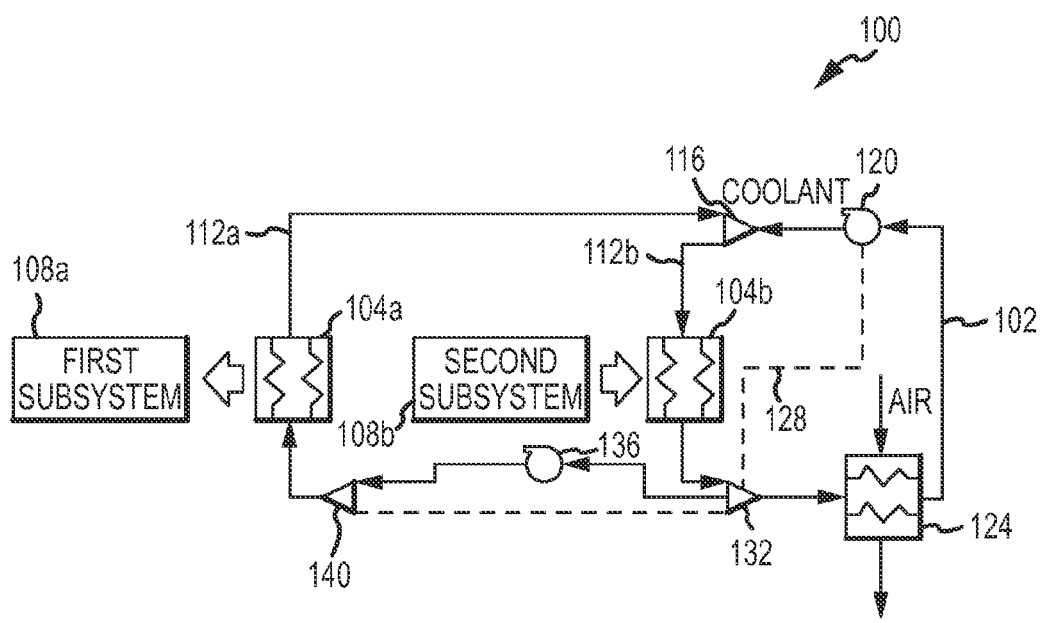
FIG. 4 is a schematic of a pattern of coolant flow that illustrates a waste heat utilization mode of the parallel integrated thermal management system of FIG. 1.

FIG. 4 illustrates a pattern of coolant flow that may be established in the system 100 in the waste heat utilization mode. As shown in FIG. 4, the system 100 operates to transfer heat from the second subsystem 108*b* to the first subsystem 108*a*. Specifically, the second pump 136 is engaged to thereby move a portion of the coolant output from the second heat exchanger 104*b* to the first heat exchanger 104*a*. In so doing, the second pump 136 reverses the direction of coolant flow within the first coolant loop branch 112*a*. The radiator bypass path 128 is disengaged such that a portion of the coolant output from the second heat exchanger 104*b* passes from the second coolant loop junction 132 to the radiator 124. In this mode, two streams of coolant are joined at the first coolant junction 116 and then output to the first heat exchanger 104*b*. Accordingly, with the first pump 120 and the second pump 136 operating at similar capacity, the radiator portion of the coolant loop and the first coolant loop branch 112*a* support half of the coolant flowing in the system, whereas the full coolant amount flows through the second coolant loop branch 112*b*. In this configuration, the heated coolant output by the second heat exchanger 104*b* is cooled by both the first heat exchanger 104*b* and the radiator 124. In cooling the heated coolant, the heat exchanger 104*a* transfers heat from the coolant to the first subsystem 108. The embodiment shown in FIG. 4 may be used to transfer heat from the second subsystem 108*b* to the first subsystem 108*a* to accomplish such goals as warming an internal combustion engine on start-up or providing heat to a heat pump that thereby heats the vehicle cabin.

Figure 5A:
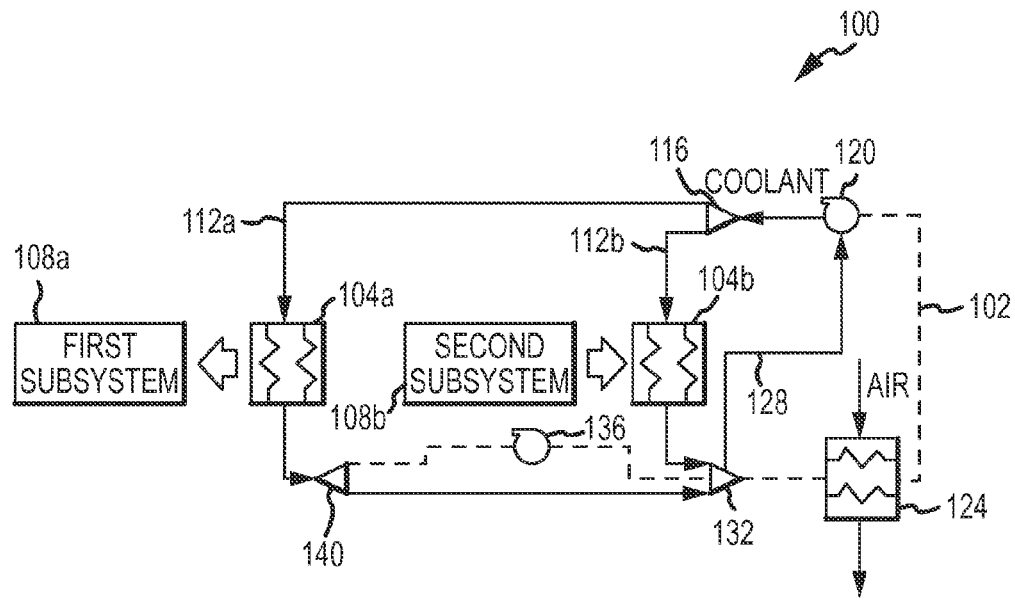
FIGS. 5A and 5B are schematics of patterns of coolant flow that illustrate another waste heat utilization mode of the parallel integrated thermal management system of FIG. 1.
Figure 5B:
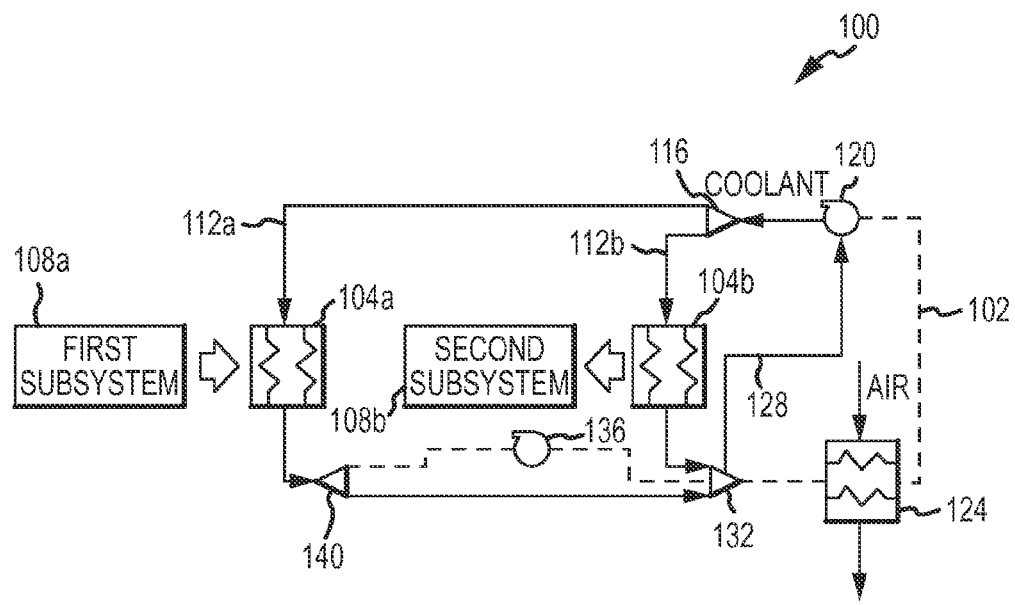

The embodiments depicted in FIGS. 5A and 5B illustrate other patterns of coolant flow that may be established in the system 100 in the waste heat utilization mode. Referring initially to FIG. 5A, the system 100 transfers heat from the second subsystem 108*a* to the first subsystem 108*b* using the bypass path 128. In contrast to the flow pattern shown in FIG. 4, the flow pattern shown in FIG. 5A does not include a reverse flow of coolant through the first heat exchanger 104*a*. In FIG. 5A, heat is transferred between subsystems 112*a-b* by maintaining a normal direction of coolant flow through the first and second heat exchangers 104*a-b* and bypassing the radiator 124. Specifically, the first coolant loop branch 116 outputs coolant from the pump 120 to both the first and second coolant loop branches 112*a-b*. Here, heated coolant is output from the first and second heat exchangers 104*a-b* and from there to the second coolant loop junction 116. From the second coolant loop junction 116, the coolant passes back to the pump 120 directly through the bypass path 128. In bypassing the radiator 124, the coolant retains heat and passes the retained heat to the first subsystem 108*a* through the first heat exchanger 104*a*. Similarly, in FIG. 5B, heated coolant output from the first heat exchanger 104*a* is passed directly to the pump 120 by way of the radiator bypass 128. The heated coolant is then passed to the second heat exchanger 104*b* where retained heat is passed to the second subsystem 108*b*.

The waste heat utilization mode may be used to heat an internal combustion engine subsystem. In so doing, the system 100 may either maintain an inactive engine at a warm temperature or gradually warm a cold engine. This mode of operation can improve the warm-up time of the engine and can be applied to the engine whether the engine is on or off. Maintaining a warm engine as described herein can benefit the emissions and fuel economy for both PHEVs and HEVs by reducing or eliminating the time in which the engine operates at lower, inefficient temperatures. For a PHEV with a significant all-electric range, the ability to warm-up the engine prior to an engine start may also improve fuel economy and emissions.

In accordance with embodiments discussed herein, the waste heat utilization mode may be used to supplement an auxiliary heating system for cabin heating such as an electric heater or engine coolant heater. If the waste heat utilization mode is used to supplement an engine coolant heater, the system 100 may save fuel by reducing the time needed to run the engine for cabin heat. When used to supplement an electric heater, the system 100 reduces the power requirement from the energy storage system and thus extends the electric range of the vehicle.

The waste heat utilization mode may be used in connection with a PHEV charger that is integrated with the electric drive system. Integrating the charging system into the electric drive power electronics and electrical machines (PEEM) components has the advantage of reducing cost, volume, and weight. Operating in the waste heat utilization mode, the system 100 may use the thermal capacitance of the engine to provide a sink for the waste heat from the charging system. In so doing, the system 100 reduces reliance on the radiator fan, thereby improving the net charging efficiency and reducing noise.

EXAMPLES

The three coolant output configurations (modes of operation) disclosed herein, i.e., the combined cooling mode, the subsystem off mode, and the waste heat utilization mode, can be applied to a range of vehicle subsystems that require cooling. The following examples describe in detail certain properties of embodiments of the systems disclosed herein that integrate the PEEM subsystem cooling with either the internal combustion engine subsystem or the air conditioning (AC) subsystem. It will be apparent to those skilled in the art that many modifications, both to materials and methods, may be practiced without departing from the scope of the disclosure.

Example #1

PEEM and Internal Combustion Engine Integration

Figure 6:
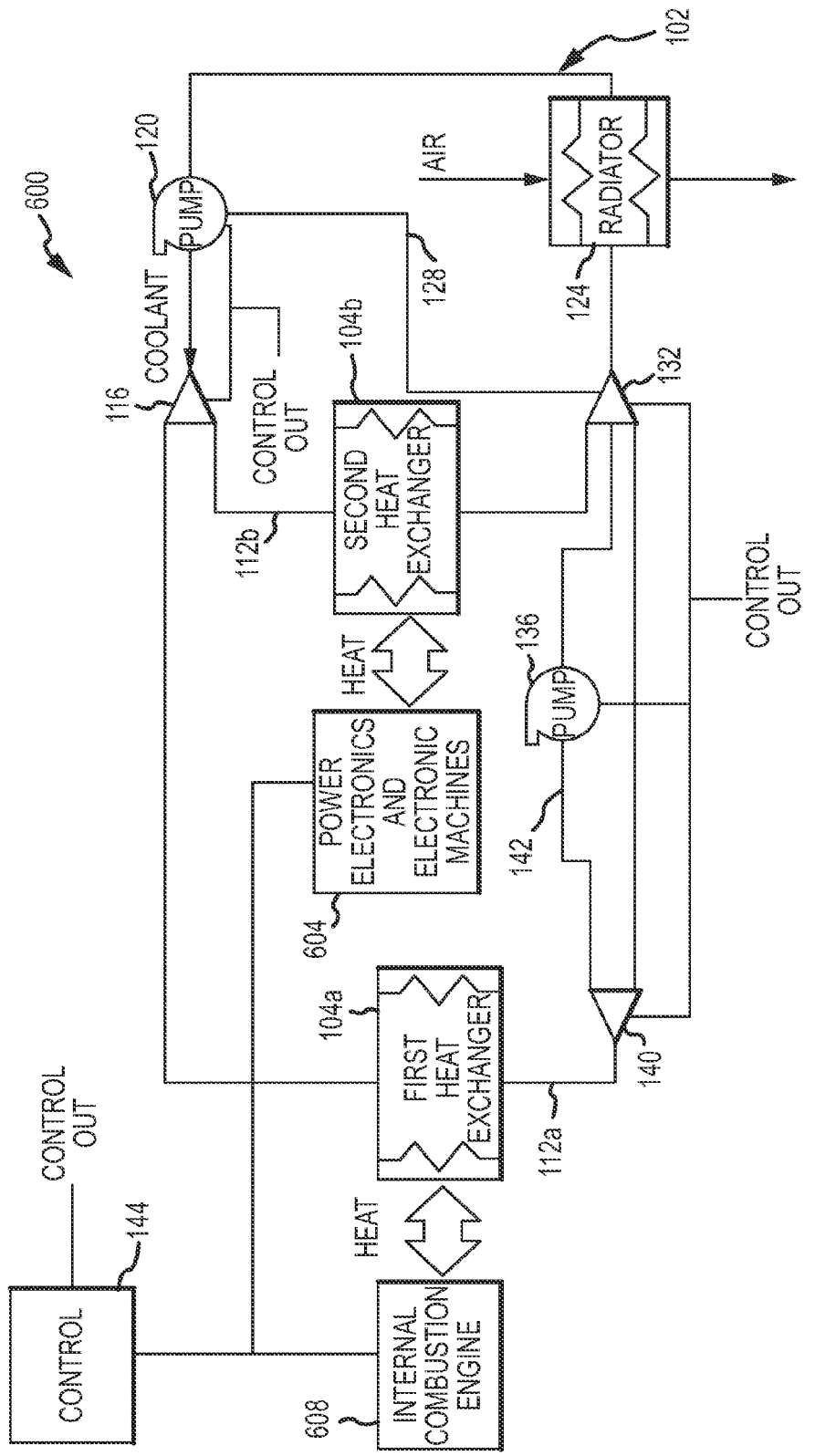
FIG. 6 is a schematic of an embodiment of the parallel integrated thermal management system shown in FIG. 1 that incorporates an internal combustion engine.

FIG. 6 is a schematic illustration of an exemplary implementation of the parallel integrated thermal management system 100 shown in FIG. 1. The parallel integrated thermal management system 600 shown in FIG. 6 incorporates an internal combustion engine 608 subsystem and a power electronics and electric machines 604 subsystem. The power electronics and electric machines subsystem is generally referred to herein as the "electric subsystem 604." The internal combustion engine 608 is associated with the first coolant loop branch 112*a*. The electric subsystem 604 is associated with the second coolant loop branch 112*b*.

Figure 7:
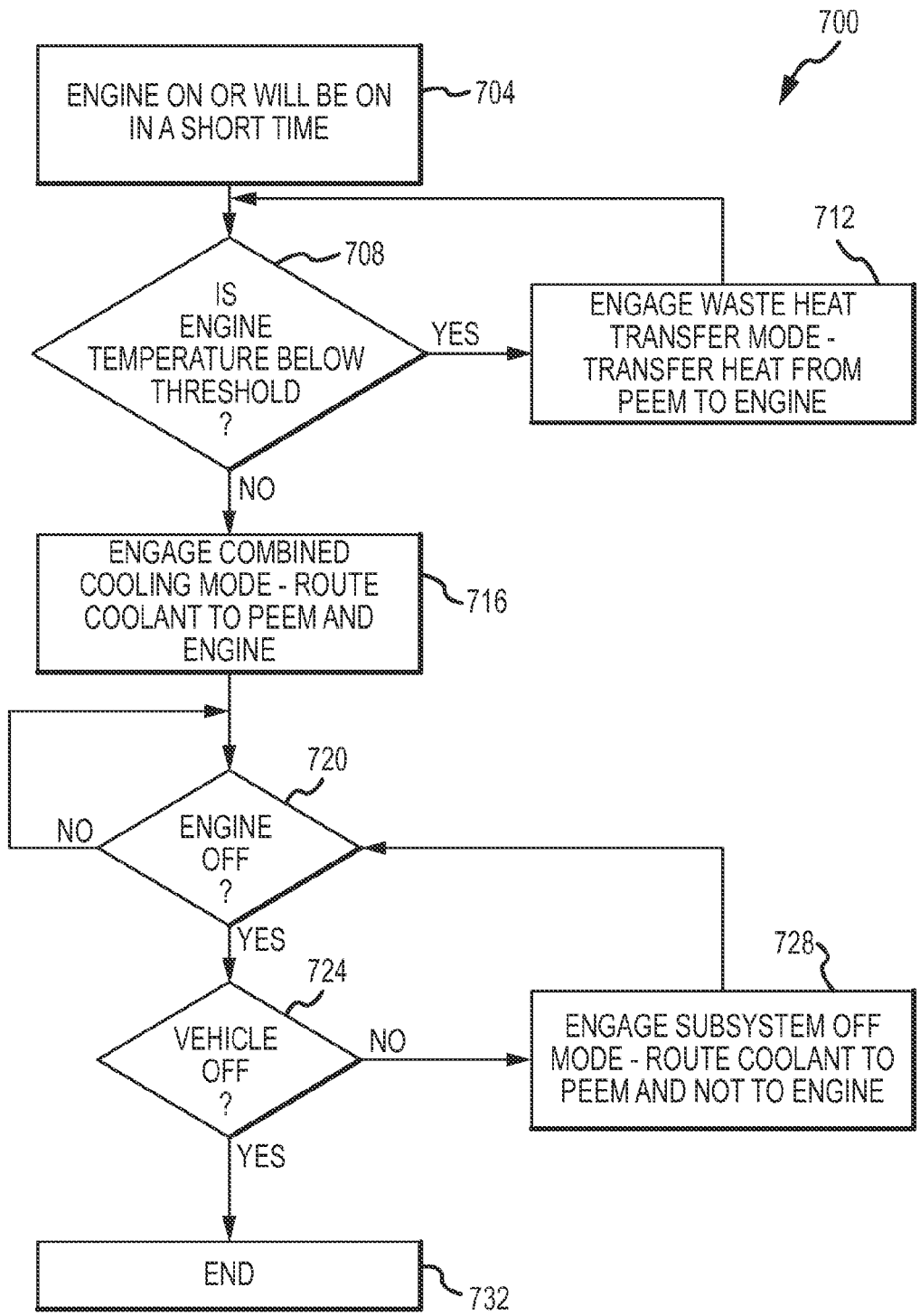
FIG. 7 is a flow chart that illustrates a parallel integrated thermal management method that may be executed by the embodiment shown in FIG. 6.

FIG. 7 is a flowchart 700 illustrating an exemplary method of thermal management for the system 100 that shares coolant between a power electronic subsystem and an internal combustion engine subsystem. The flow chart 700 illustrates operations of the control element 144 that serve to manage the heat content in the thermal management system 600, shown in FIG. 6. Specifically, the flow chart 700 illustrates operations of the control element 144 at various stages in a trip made using a vehicle having the system 600 that is shown in FIG. 6.

Initially, in operation 704, the internal combustion engine 608 is turned on or will be turned on at some point in the near future. In one embodiment, operation 704 includes a user initially turning on his or her vehicle. In another embodiment, operation 704 includes a switch over in a hybrid electric vehicle between an electric drive and the internal combustion engine 608 at a point in which the battery power for the electric drive system is exhausted. In either embodiment, the internal combustion engine 608 is cold or otherwise at a low temperature due to non-use. Following operation 704, operation 708 may be executed.

In operation 708, the control element 144 determines whether the internal combustion engine 608 temperature is below a predetermined threshold temperature. If, in operation 708, the engine temperature 608 is below the threshold temperature, operation 712 may be executed following operation 708. If the engine temperature is not below the predetermined temperature threshold, operation 716 may be executed following operation 708.

In operation 712, the control element 144 causes the system 100 to transfer waste heat from the electric subsystem 604 to the internal combustion engine 608 subsystem. In one instance, this may include reversing the flow of coolant through the heat exchanger 104*a*, while maintaining normal flow direction through the electric subsystem 604. Here, the heat rejected from the electric subsystem 604 is transferred to the internal combustion engine 608, thus warming the engine 608. In certain embodiments, normal flow directions may be maintained in both the electric subsystem 604 and the internal combustion engine 608 subsystem, while the bypass path 128 maintains heat within the system 600 to thereby add heat to the internal combustion engine 608. Adding heat to the internal combustion engine 608 as described in connection with operation 712 serves to raise the temperature of the internal combustion engine to a level which allows for a more efficient usage of fuel. Following operation 712, operation 708 may again be executed such that a determination may again be made as to whether the engine temperature is below the predetermined threshold.

In operation 716, the engine temperature is above the predetermined threshold; accordingly, the control element 144 causes coolant to flow into both the electric subsystem 604 and the internal combustion engine 608 subsystem. Here, coolant flows into both subsystems 604, 608 such that heat is removed for each and the heated coolant is cooled by the radiator 124. From there the coolant is passed through the system 600 again by way of the pump 120. In connection with operation 716, the control element 144 may additionally adjust flow rates within the system to minimize parasitic losses, and so on. Following operation 716, operation 720 may be executed.

In operation 720, the control element 144 determines if the internal combustion engine is off. If in operation 720, it is determined that the internal combustion engine 608 is not off and remains running, the control element 144 may execute a loop or other delay element such that operation 720 is again executed after an appropriate amount of time. In the delay loop, the internal combustion engine 608 may continue to run and be cooled by coolant provided to the engine through the first coolant loop branch 112a. If, in operation 720, the control element determines that the engine is off, operation 724 is executed.

In operation 724, the control element 144 determines whether the vehicle is off. If, in operation 724, it is determined the vehicle is not off, operation 728 may be executed. In operation 728, the engine 608 is off but the vehicle remains on. In this state, the pattern of coolant flow in the system 100 may be configured to maintain the internal combustion engine 608 temperature, such that when the engine is again engaged to move the vehicle, the engine temperature remains at an effective or efficient level. In this regard, operation 728 may include routing coolant through the second coolant branch to the power electronics components only and not routing coolant through the internal combustion engine subsystem. In so doing, the internal combustion engine maintains its temperature. If, in operation 724, the vehicle is off, operation 732 may follow such that the method ends.

Example #2

PEEM and Air Conditioning System Integration

Figure 8A:
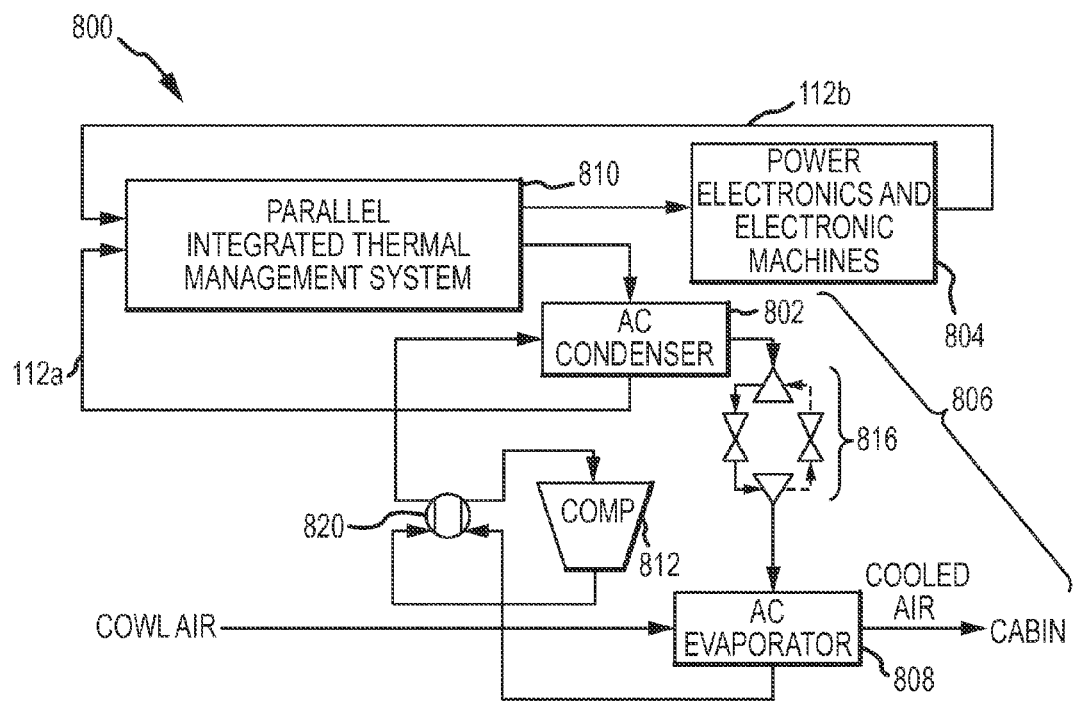
FIGS. 8A and 8B are schematics of an embodiment of the parallel integrated thermal management system shown in FIG. 1 that incorporates an air conditioning subsystem.
Figure 8B:
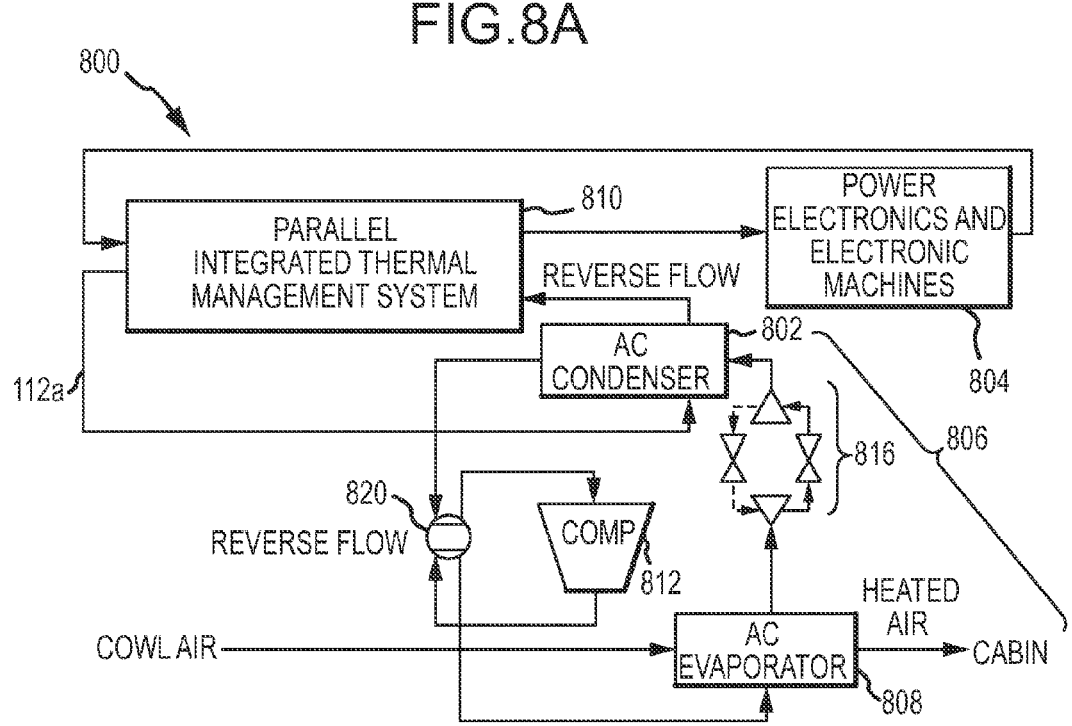

FIGS. 8A and 8B are schematic illustrations of certain embodiments of the parallel integrated thermal management system 100 shown in FIG. 1. The parallel integrated thermal management system 800 shown in FIGS. 8A and 8B incorporates an air conditioning subsystem 806 and an electric subsystem 804. The first coolant loop branch 112a includes an air conditioning condenser 802 component of the air conditioning subsystem 806. The electric subsystem 804 is associated with the second coolant loop branch 112b. The air conditioning condenser 802 and the electric subsystem are connected in parallel through the thermal management system 810, which includes the control element 144, the radiator 124, pump 120 and other components of the coolant system shown in FIG. 1.

The air conditioning subsystem 806 shown in the embodiment depicted in FIG. 8A includes an AC evaporator 808 connected to the AC condenser 802 by way of a bi-direction path 816. The AC evaporator 808 is connected to a path reversal element 820, which in turn is connected to a compressor 812. The path reversal element 820 is operable to change the direction of refrigerant flow within the air conditioning system 806. As shown in FIG. 8A, refrigerant flows from the AC condenser 802 to the AC evaporator 808. In this configuration, the air conditioning subsystem 806 functions to cool the vehicle cabin. Specifically, cooled air is output from the AC evaporator 808 into the vehicle cabin.

As shown in the embodiment depicted in FIG. 8B, the path reversal element 820 is operable to reverse the direction of refrigerant flow in the air conditioning system. As shown in FIG. 8B, when the direction of refrigerant flow is reversed the refrigerant flows from the AC condenser 802 to the compressor 812 and from there to the AC evaporator 808. In this configuration, the AC evaporator 808 functions as a heat pump to output heated air into the vehicle cabin. Additionally, as shown in FIG. 8B, with the direction of refrigerant flow reversed in the air conditioning system, the direction of coolant flow is also reversed in the parallel integrated thermal management system 800. The configuration in FIG. 8B includes reversing the direction of coolant flow first coolant loop branch 112a through the operation of the pump 136, and so on. Through the operation of the system shown in FIGS. 8A and 8B, the parallel integrated thermal management system 800 may function to increase the efficiency of the air conditioning subsystem 806 in its operation as a cabin heating system. For example, this could extend the range of an electric vehicle be reducing the amount of energy required from the battery to provide cabin heating.

Figure 9:
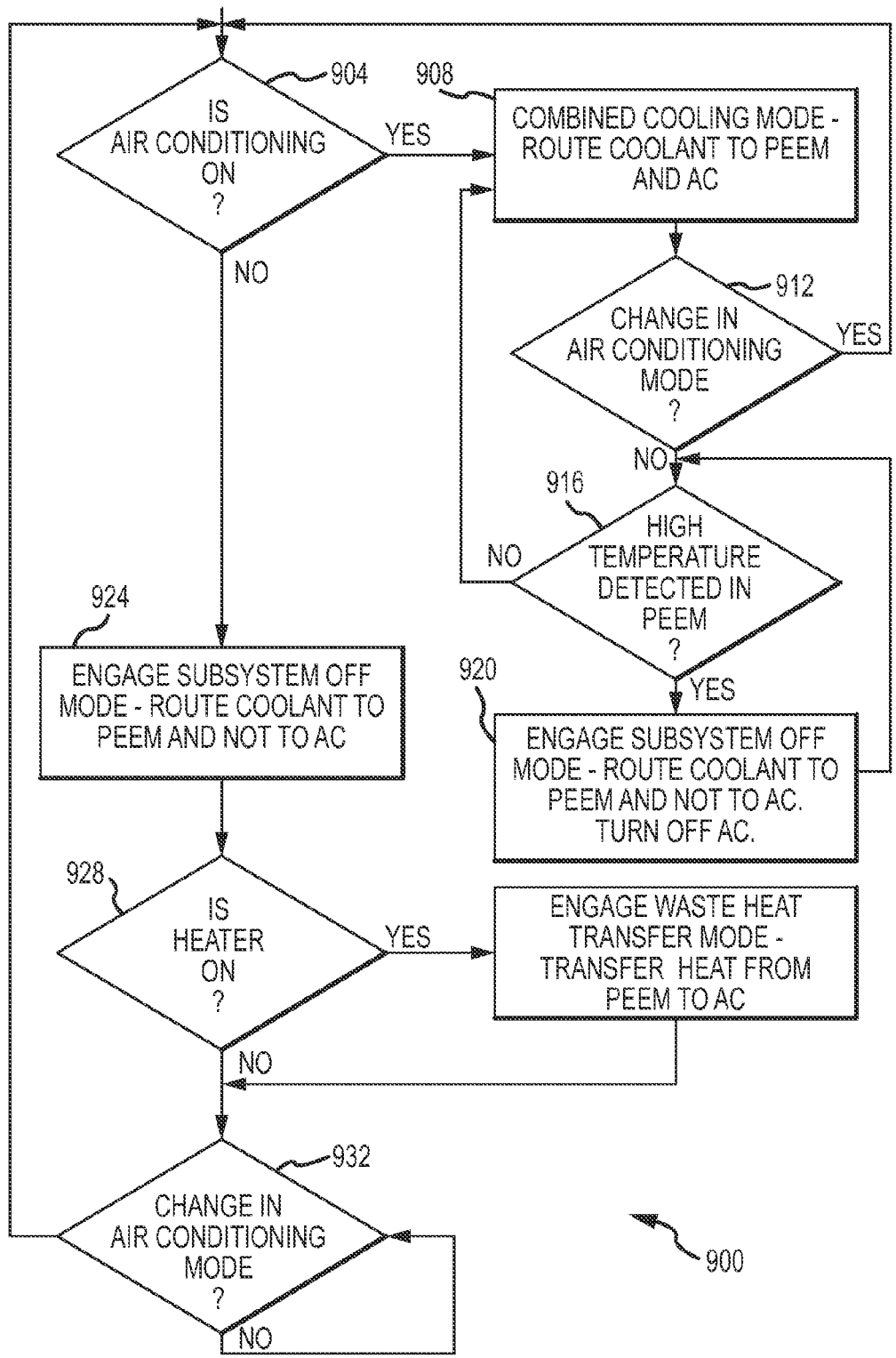
FIG. 9 is a flow chart that illustrates a parallel integrated thermal management method that may be executed by the embodiment shown in FIGS. 8A and 8B.

FIG. 9 is a flowchart 900 illustrating an exemplary method of thermal management for the system 100 that shares coolant between an electric subsystem 804 and an air conditioning condenser 802. The flow chart 900 illustrates operations of the control element 144 that serve to manage the heat content in the thermal management system 800 shown in FIGS. 8A and 8B. The flow chart 900 illustrates operations of the control element 144 for various setting of the air conditioning subsystem 806 associated with a vehicle having the system 800 that is shown in FIGS. 8A and 8B.

Initially, in operation 904, the control element 144 determines if the air conditioning subsystem 806 is on. If, in operation 904, it is determined that the air conditioning system 800 is on operation 908 may be executed. In operation 908, the control element 144 configures the system into the combined cooling mode. In the combined cooling mode, the control element 144 causes the first coolant loop junction 116 to route coolant to the electronic system 804 and to the air conditioning system condenser 802. In this configuration, the system removes heat from both the electric subsystem 804 and the air conditioning system condenser 802. The system 800 may function in this manner until the operator of the vehicle changes the air conditioning mode. For example, the operator may turn the air conditioning 806 off or may switch the air conditioning 806 into a mode where the cabin is heated rather than cooled. Accordingly, operation 912 may be executed following operation 908.

In operation 912, the control element 144 determines whether the user has made such a change to the air conditioning subsystem 806 mode. If, in operation 912, the user has in fact changed the air conditioning mode, operation 904 may again be executed and the decision tree restarted. If, however, the user has not changed the air conditioning mode, operation 916 may follow operation 912.

In operation 916, the control element 144 may monitor the temperature of the electric subsystem 804. Because the coolant is currently divided between two subsystems, the power electric subsystem 802 may be monitored to ensure that overheating does not occur. Overheating may occur in extreme operating conditions that make excessive or high use of the electric subsystem 804. If, in operation 916, the control element 144 determines that a high temperature is present in the electric subsystem 804, operation 920 may be executed.

In operation 920, the control element 144 may route the coolant to the electric subsystem 804 only and not to the air conditioning condenser 802. Here, the electric subsystem 804 is given a higher priority for receiving coolant so that the electric subsystem 804 will not experience a high temperature that may result in damage. As an additional precaution, the system 100 may turn of the air conditioning subsystem 806. Following operation 920, operation 916 may again be executed such that the control element 144 determines again if the high temperature condition still is present in the electric subsystem 802. If the high temperature condition is no longer present, operation 912 may again be executed to determine if the air conditioning 806 mode has been changed.

Referring again to operation 904, if, in operation 904 the control element 144 determines that the air conditioning is not on, operation 924 may be executed. In operation 924, the control element 144 configures coolant flow in the system to route coolant to the electric subsystem 804 and not to the air conditioning condenser 802. In operation 924, the coolant may be routed to the air conditioning condenser 802, because the air conditioning is not being used by the vehicle operator. Following operation 924, operation 928 may be executed.

In operation 928, the control element 144 may determine if the air conditioning subsystem 806 is switched into a cabin heating mode. If cabin heating mode is enabled, operation 934 may be executed following operation 928. In operation 934, the control element 144 may configure coolant flow to transfer waste heat from the electric subsystem 804 to the air conditioning condenser 802. This may include reversing the flow of the coolant within the first coolant loop branch 112a or may include maintaining normal flow direction in the first coolant loop branch 112a and utilizing the radiator bypass 128 to maintain heat within the system 800. Following operation 934, or operation 928, operation 932 may be executed. In operation 932, the control element 144 determines whether or not the user has changed the air conditioning subsystem 806 mode. If no change is detected, the control element 144 may operate in a loop mode where operation 932 may again be executed at a later time to determine if the vehicle operator has changed the air conditioning subsystem 806 mode. If, at any time, the control element 144 determines that the user has in fact changed the air conditioning 806 mode, operation 904 may again be executed following operation 932.

Figure 10:
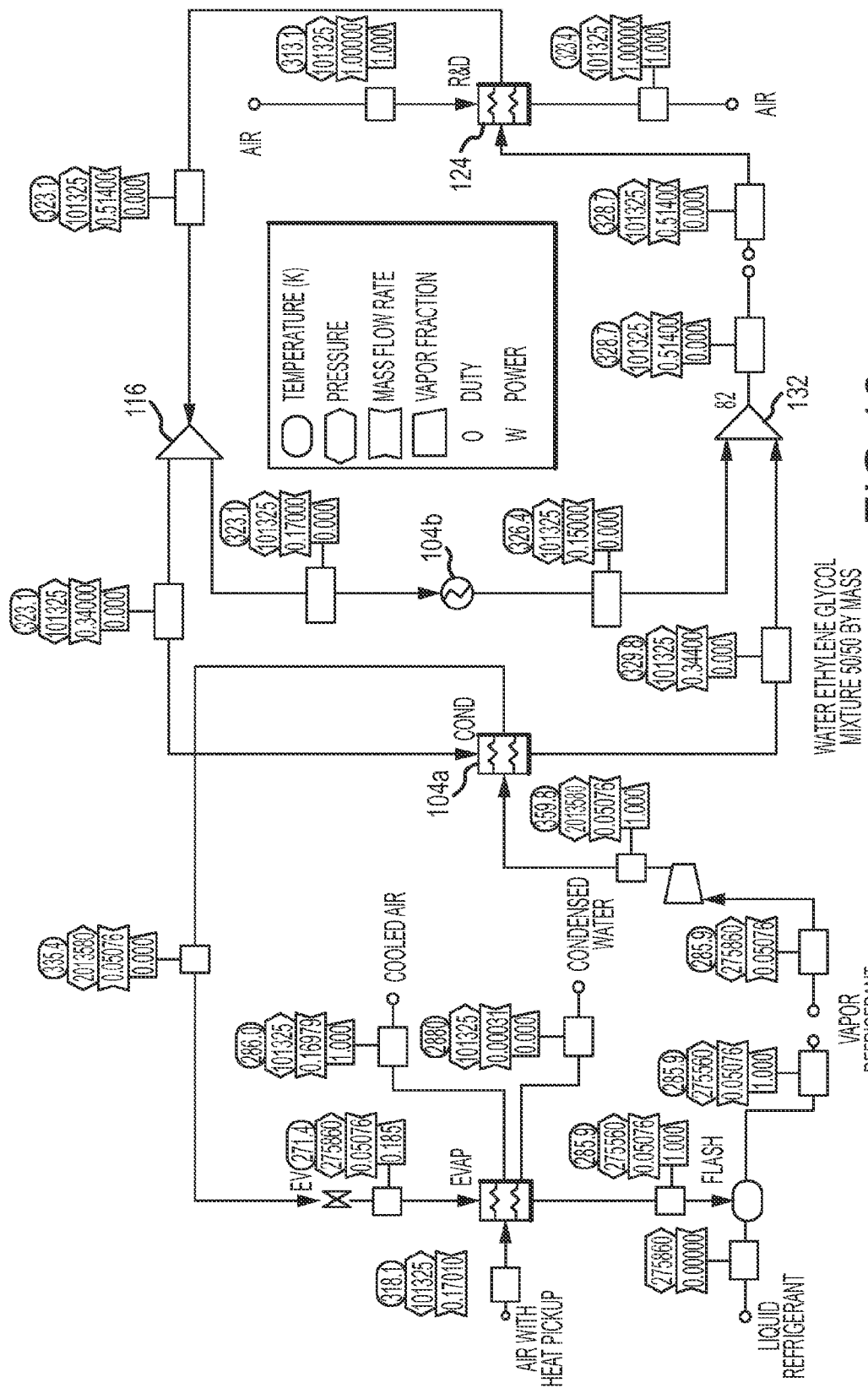
FIG. 10 is schematic illustration of an operating point for the parallel integrated thermal management system shown in FIG. 8A.

FIGS. 8A and 8B show exemplary thermal management systems that incorporate an air conditioning subsystem and a electric subsystem. In the depicted embodiment, the low temperature coolant loop rejects heat from the electric subsystem and the AC system. The electric pump and coolant loop junction maintain optimal flow rates through each of the coolant loops to reduce the parasitic pumping power and to reduce fluctuation of the coolant temperature. A detailed model of an exemplary parallel configuration is shown in FIG. 10 that incorporates the AC system and the low temperature water ethylene glycol coolant loop. The embodiment shown in FIG. 10 specifies a coolant temperature into the condenser and electric subsystem of 50° C. (323.15 K). The intent of FIG. 10 is to highlight a potential operating point.

Finally, it should be noted that there are alternative ways of implementing the embodiments disclosed herein. While a number of exemplary aspects and embodiments have been discussed above, those of skill in the art will recognize certain modifications, permutations, additions and sub combinations thereof. Accordingly, the present embodiments are to be considered as illustrative and not restrictive. Furthermore, the claims are not to be limited to the details given herein, and are entitled their full scope and equivalents thereof.

The invention claimed is:

1. A thermal management system for an automobile, comprising:
    a coolant loop having a coolant loop junction, the coolant loop junction configured to receive coolant from a radiator output and to distribute the coolant between a first coolant loop branch and a second coolant loop branch;
    a first pump disposed between the radiator and the coolant loop junction in the first loop branch, the first pump configured to provide coolant to the first coolant loop junction, and the first pump is additionally connected to a radiator bypass path;
    a first heat exchanger connected to the coolant loop junction by the first coolant loop branch and configured to use coolant received from the coolant loop junction to exchange heat with a first vehicle component;
    a second heat exchanger connected to the coolant loop junction by the second coolant loop branch and configured to use coolant received from the coolant loop junction to exchange heat with a second vehicle component;
    a second pump disposed between the first heat exchanger and the second heat exchanger in the second loop branch, the second pump configured to provide coolant, heated by the second heat exchanger, from the second heat exchanger output to the first heat exchanger in a reverse flow through the first heat exchanger relative to the direction of coolant flow through the first heat exchanger supplied by the first pump; and
    a control element configured to control flow of coolant in at least one of the first and second coolant loop branches in response to a condition detected in at least one of the first and second vehicle components, wherein in a first mode, heated coolant from at least a second heat exchanger output is provided directly to the first pump through the radiator bypass path, and in a second mode, heated coolant from at least the second heat exchanger output is cooled by the radiator and then provided to the first pump.

2. The thermal management system of claim 1, wherein the control element is configured to maintain a target rate of heat exchange in at least the second heat exchanger by varying a rate at which coolant is pumped through the first pump in response to the condition detected in the at least one of the first and second vehicle components.

3. The thermal management system of claim 1, further comprising:
    a second coolant loop junction configured to receive heated coolant from both the first and second coolant loop branches and to output the received coolant in a single output flow to either the radiator or to the radiator bypass path.

4. The thermal management system of claim 1, wherein the first vehicle component is an internal combustion engine and the second vehicle component is an electric system.

5. The thermal management system of claim 1, wherein the first vehicle component is an air conditioning system and the second vehicle component is an electric system.

6. The thermal management system of claim 1, wherein the first vehicle component is a transmission fluid system and the second vehicle component is an electric system.

7. The thermal management system of claim 1, wherein the first and second vehicle components are independently selected from an internal combustion engine, an air conditioning system, a transmission fluid system, a brake fluid system, an electric system, a power electronics subsystem, or a heat pump.

8. The thermal management system of claim 3, further comprising:
    a third coolant loop junction configured to receive coolant output from the first heat exchanger and to output the received coolant to the second coolant loop junction.

9. The thermal management system of claim 1, wherein the coolant is selected from water, deionized water, ethylene glycol, poly(ethylene glycol), diethylene glycol, propylene glycol, betaine, polyalkylene glycols, copper oxide nanofluids, alumina nanofluids, titanium dioxide nanofluids, silica nanofluids, carbon nanofluids, and combinations thereof.

10. The thermal management system of claim 1, further comprising a third mode wherein the heated coolant from the second heat exchanger output is transferred by the second pump in the reverse flow through the first heat exchanger to transfer heat to the first vehicle component.

\* \* \* \* \*